Nov. 26, 1957     A. J. SCHUTT     2,814,448
AUTOMOTIVE HEATING SYSTEM
Filed June 2, 1952     2 Sheets-Sheet 2
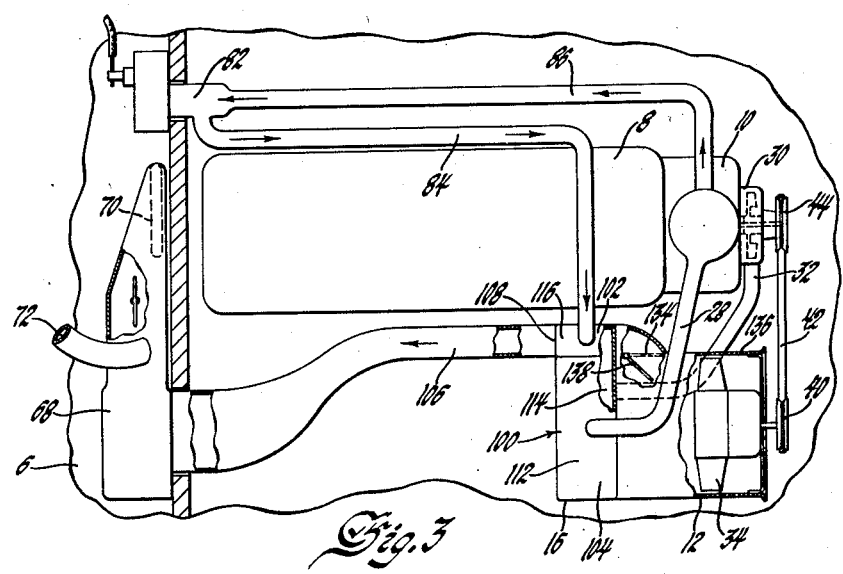
Inventor
Arthur J. Schutt
By Willits, Helwig & Baillio
Attorneys United States Patent Office 2,814,448
Patented Nov. 26, 1957

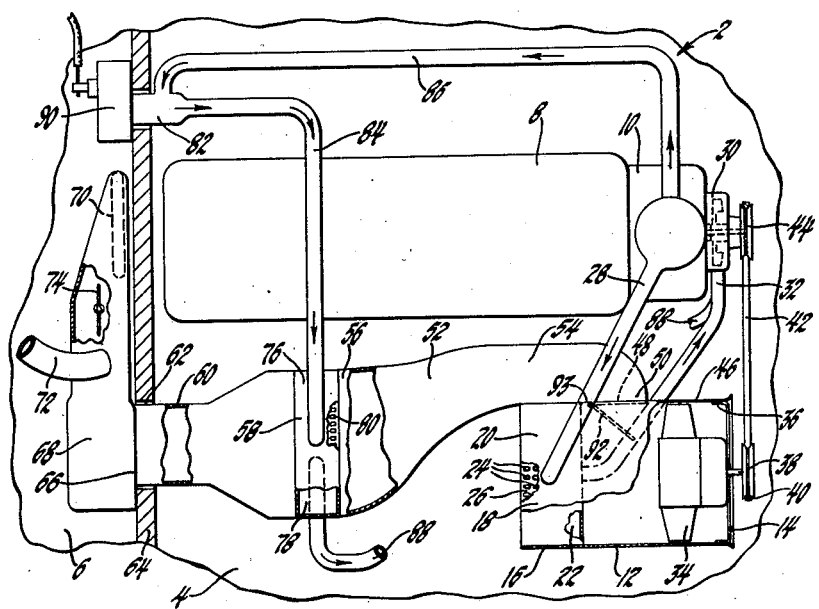

2,814,448

AUTOMOTIVE HEATING SYSTEM

Arthur J. Schutt, Lockport, N. Y., assignor to General Motors Corporation, Detroit, Mich., a corporation of Delaware Application June 2, 1952, Serial No. 291,228

9 Claims. (Cl. 237—8)

This invention relates to systems for cooling liquid engine coolants and for heating passenger compartments of automotive vehicles.

In the design of automotive vehicles certain advantages reside in reducing the length of the front portion thereof or the distance from the windshield to the forwardmost extremity of the vehicle. In conventional designs of automotive vehicles the radiator for cooling the liquid engine coolant is dosposed forwardly of the engine and in spaced relation therewith. Such an arrangement obviously lengthens the forward portion of the vehicle thereby not only increasing the cost of manufacture thereof but the added length also tends to obstruct the view of the operator.

One object of the present invention is to so arrange the engine coolant of an automotive vehicle with respect to the engine that the length of the forward portion of said vehicle may be materially reduced.

Another object is to provide an engine coolant radiator within an air duct and to conduct the air heated thereby into the vehicle for heating purposes.

A further object is to provide a duct in the engine compartment of a motor vehicle having a first radiator therein for cooling the liquid engine coolant and a second radiator for heating air for vehicle heating purposes.

A still further object is to provide in an air duct system mounted in the engine compartment of a motor vehicle, one or more radiators connected to the engine coolant system, means for inducing air flow through said first system and valve means for controlling the flow of air therein.

Another object is to provide in a system of the stated character main and branch duct means, radiators mounted in said main and branch ducts through which the engine coolant is circulated, valve means for controlling the flow of air in said branch duct, a thermostatically controlled valve for controlling the flow of coolant to the radiator in said branch duct, by-pass means for by-passing said thermostatically controlled valve, a valve in said by-pass, and means interconnecting said first and last mentioned valves whereby when said first valve is open said by-pass is closed.

A still further object is to provide an engine cooling and car heating system which is simple in construction, economic in manufacture, and highly efficient in operation.

Other and further objects of the invention will become apparent as the description thereof progresses.

Of the drawings:

Fig. 1 is a plan view, partly in section, of the front portion of a motor vehicle showing the structure and arrangement of the system for cooling engine coolants and for vehicle heating, certain parts being broken away to more clearly shown certain features thereof.

Fig. 2 is a similar view, partly in section with parts broken away, of a system of a modified construction.

Fig. 3 is a view similar to Figs. 1 and 2 but showing a still further modification.

Fig. 4 is a fragmentary plan view, partly in section, showing an air duct and associated parts of a further modified construction.

Fig. 5 is a plan view similar to Fig. 4 but showing a still further modification, and Fig. 6 is a plan view, partly in section, similar to Figs. 4 and 5 but showing a still further modification.

Referring to the drawings, the numeral 2 designates generally a motor vehicle having the usual engine compartment 4 and a passenger compartment 6. The engine compartment 2 has mounted therein in the usual fashion an internal combustion engine 8 having a jacket 10 through which a liquid coolant may be circulated. Mounted adjacent engine 8 and disposed in spaced substantially parallel relation therewith is a duct 12 through which air may flow as a result of the forward movement of the vehicle. Duct 12 is open at its forward or air inlet end 14 and has mounted at the rearwardly disposed end 16 thereof a radiator core 18 of any suitable construction. Radiator core 18 may comprise an upper tank 20, a lower tank 22, the said tanks being connected by a series of fluid conducting tubes 24 having the usual fins 26 secured in intimate contact therewith. The tubes 24 and fins 26, as is well known in the art, are spaced apart to provide a series of openings through which the air entering ducts 12 may pass and discharge into the engine compartment 4. Tank 20 is connected to the jacket 10 of engine 8 by a pipe connection 28. Tank 22 is connected to the coolant circulating pump 30 of engine 8 by a second pipe connection 32. In order to induce rapid flow of air through duct 12 a fan 34 is mounted in any suitable fashion as by a bracket 36 near the front end of duct 12. The drive shaft 38 of fan 34 has secured thereto a pulley 40 which is connected by means of a driving belt 42 to a second pulley 44 operatively connected to the drive shaft of the engine 8. Thus, upon operation of engine 8 fan 34 will be driven through the connections just described causing air to flow through duct 12, radiator 18, and be discharged therefrom into engine compartment 4.

The inner side wall 46 of duct 12 has provided therein an opening 48 which communicates with the inlet end 50 of a branch duct 52. Duct 52 is relatively narrow at its forward end 54. The intermediate portion 56 of duct 52 is enlarged and has mounted therein a second radiator core 58. Intermediate portion 56 terminates in a reduced portion 60 which extends through an aperture 62 provided in the dash or fire wall 64 disposed between engine compartment 4 and passenger compartment 6. The outlet end 60 of duct 52 communicates with the inlet end 66 of a distributing casing 68 mounted in passenger compartment 6 which conducts air to a discharge opening 70 disposed between the side walls of passenger compartment 6. Distributor 68 also has a connection 72 which conducts the air entering distributor 68 to certain nozzles disposed beneath the windshield, not shown, for windshield defrosting purposes or for heating the upper portion of compartment 6. A butterfly valve 74 is provided in distributor 68 and is adjustable so as to apportion the air flowing through said distributor between discharge opening 70 and defroster connection 72. Distributors of this general type are well known in the art and for a complete description of such a mechanism reference may be had to the co-pending application of Harold J. Schoelles, Serial No. 194,647, filed November 8, 1950, now Patent No. 2,684,620. Radiator 58 also comprises an inlet tank 76 and a discharge tank 78, which are connected by a series of finned tubes 80. Inlet tank 76 is connected to a thermostatically controlled valve 82 by a pipe connection 84, valve 82 in turn being connected to the upper end of jacket 10 by a pipe connection 86. The discharge tank 78 of radiator 58 is connected to the coolant circulating pump 30 of engine 8 by a pipe connection 88. Valve 82 is controlled by an adjustable thermostat indicated generally at 90 mounted within the passenger compartment 6 of the vehicle. When the temperature within the compartment 6 falls below a predetermined value, the valve associated with thermostat 90 will open thereby permitting liquid from jacket 10 to circulate through radiator 58. When the temperature in the passenger compartment exceeds a certain value valve 82 will be moved towards closed position by the thermostat 90 thereby shutting off or partially shutting off the flow of heated liquid engine coolant to radiator 58. Thermostatically controlled valves such as that indicated at 82 are well known in the art and for a complete disclosure of one such valve reference may be had to the co-pending application of Arthur J. Schutt, Serial No. 125,029, filed November 2, 1949, now Patent No. 2,663,499.

The opening 48 disposed between ducts 12 and 52 may be closed by means of a closure shown at 92 pivotally mounted at 93. The closure 92 may be operated from within the vehicle compartment by any suitable means such as a Bowden cable, not shown, if it is so desired. When closure 92 is open it is seen that a portion of the air entering duct 12 will discharge through opening 48 and will be conducted through duct 52 across radiator 58 and thence discharge into distributor 68 which in turn delivers a portion of the air into the vehicle through opening 70 and a portion to the windshield defrosting nozzles as desired. When closure 92 is moved to fully closed position all of the air flowing into duct 12 will be discharged into engine compartment 4. From the foregoing description it is seen that the entire air circulating system including the radiators 18 and 58 are disposed within the engine compartment and that the entire space occupied does not extend beyond the front end of the engine. The portion of the vehicle extending forwardly of fire wall 64 therefore is materially reduced.

Fig. 2 discloses a somewhat modified construction. This construction also comprises a duct 12 mounted in substantially parallel relation with an engine 8. A radiator 100 consisting of a relatively narrow inner section 102 and a relatively wide or outer section 104 occupies the entire discharge end 16 of duct 12. A branch duct 106 is operatively connected to a portion of duct 12 and has a width corresponding substantially to the width of the inner section 102 of radiator 100 and the inlet end 108 thereof communicates with the discharge side of said radiator section. The discharge end 110 of duct 106 extends through an aperture 62 provided in fire wall 64 and is connected to the inlet end of distributor 68 mounted in the passenger compartment 6 of the vehicle. Radiator section 104 has an upper tank 112 which is connected to the coolant jacket 10 of engine 8 by a pipe connection 28. The lower tank 114 is connected to the circulating coolant pump 30 of engine 8 by pipe connection 32. The upper tank 116 of radiator section 102 has connected thereto one end of a pipe 84, the other end of which being connected to a thermostatically controlled valve 82 which in turn is connected to the engine jacket 10 by a pipe 86. Pipes 84 and 86 are connected by means of a by-pass connection 118 having a butterfly type of valve 120 mounted therein. Valve 120 has secured thereto an operating arm 122 which is connected to an arm 124 connected to a valve 126 mounted in duct 106 by connecting link 128. Valves 120 and 126 are so interconnected that when valve 126 is in the full-line position shown in Fig. 2, valve 120 closes by-pass 118 thereby compelling the fluid from engine jacket 10 to flow to valve 82 in the direction of the arrows before entering the upper tank 116 of radiator section 102. The lower tank 114 is common to radiator sections 102 and 104 and as pointed out hereinbefore is connected to the circulating pump 30 of engine 8 by a pipe connection 32. Valves 120 and 124 may be controlled by any suitable means, as by a Bowden cable, from within the passenger compartment, if it is so desired, or from any other source. It is seen that when valve 126 in duct 106 is in the position shown in full lines in Fig. 2, a portion of the air flowing through duct 12 will pass through radiator section 102 and will then flow through duct 106 to distributor 68 where it will be directed to either discharge opening 70 or to defroster take-off connection 72, depending upon the position of butterfly control valve 74. When valve 126 is in its upper position thereby preventing flow of air through duct 106, valve 120 will be open causing the coolant from engine 8 to by-pass thermostatically controlled valve 82. When valve 126 is in this position the air flowing through radiator section 102 will discharge into engine compartment 4 through an opening 130.

Fig. 3 shows a somewhat modified construction which also comprises an air inlet duct 12 having a radiator 100 mounted at the discharging end 16 thereof. An induction fan 34 for inducing air flow through duct 12 is also operatively connected to the drive shaft of the engine 8 by pulley and belt connections 40, 42, and 44. Radiator 100 like the radiator 100 shown in Fig. 2, is comprised of two sections, section 104 of which being disposed in duct 12, and section 102 being mounted in a second or branch duct 106 near the inlet end 108 thereof. In this case, like that shown in Fig. 2, radiator 100 consists of inlet tanks 112 and 116 disposed above and connected to the finned tubes associated with radiator sections 104 and 102, respectively. Tank 112 is connected to the engine jacket 10 by means of a pipe 28 while the lower tank 114 common to radiator sections 102 and 104 is connected to the circulating pump 30 of engine 8 by a pipe connection 32. Tank 116 of radiator section 102 is connected to a thermostatically operable valve 82 by a pipe 84, the said valve in turn being connected to engine jacket 10 by a pipe 86. The inlet end 108 of duct 106 communicates with duct 12 through an opening 134 provided in the inner wall 136 which opening may be closed by means of a valve 138. Valve 138 may be opened or closed by any suitable means, such as by a Bowden cable mounted in the passenger compartment 6 of the vehicle, or at any other desired location. When valve 138 is open a portion of the air flowing through duct 12 will enter duct 106 through opening 134 and will flow through radiator section 102 and will then be conducted to distributor 68 mounted in the passenger compartment which, as in the previously described constructions, conducts the air to a discharge opening 70 and also provides for a portion of the air to discharge through take-off connection 72.

Fig. 4 shows a further modification wherein the main air inlet duct 12 has also provided therein a radiator 100 near the discharge end thereof consisting of radiator sections 102 and 104. A branch duct 140 for conducting heated air to the passenger compartment to the vehicle, not shown, is disposed in alignment with radiator section 102 and receives the heated air flowing therethrough. Duct 140 has provided at the inlet end thereof a valve 142 which when in the position shown in Fig. 4 closes an opening 144 communicating with the discharge end 146 of duct 12. Mounted below valve 142 for movement about a pivot 148 is a second valve 150 which partially covers the discharge side of radiator section 104. Valves 142 and 150 may be actuated to open and closed position by any suitable mechanism, such as by Bowden cables provided within the passenger compartment of the vehicle or at any other desired location. It is seen that when valve 142 is in the full-line position shown in Fig. 4, heated air will flow through duct 140 to the passenger compartment of the vehicle. In order to increase or decrease the amount of air flowing in duct 140 valve 150 may be moved toward or away from radiator section 104. When the valve 150 assumes a substantially vertical position considerable resistance to the flow of air through radiator section 104 is encountered causing more air to flow through duct 140. As the valve 150 is swung in clockwise direction away from radiator 104, a greater amount of air will discharge into the engine compartment from duct 12, and a smaller amount of air will flow through duct 140. By this novel arrangement of valves it is seen that any desired amount of heated air may be conducted to the passenger compartment of the vehicle. The amount of air flowing to the passenger compartment is also regulated by damper 142. When the valve 142 is in the dotted-line position shown in Fig. 4 substantially no air will flow to duct 140 and all of the air passing through radiator section 102 will discharge into the discharge end 146 of duct 12 and will then be discharged into the engine compartment of the vehicle.

Fig. 5 shows a further modification where in the air inlet duct 12 converges at its discharge end as shown at 154 and terminates in a duct 156 adapted to conduct air to the passenger compartment of the vehicle, not shown. A radiator 158 comprising front and rear sections 160 and 162 is mounted in duct 12 near the discharge end thereof. The upper tank 164 of radiator section 160 is connected by a pipe 28 to the engine jacket (not shown) while the lower tank 165 which is common to both radiator sections is connected to the circulating pump by a pipe 32. The upper tank 166 of radiator section 162 is connected to a thermostatically controlled valve (not shown) by a pipe 84. One wall 167 of the converging portion 154 of duct 12 is provided with a discharge opening 168. A valve 170 pivoted at 172 is adapted to partially or wholly close discharge opening 168 and is also adapted to swing upwardly to the dotted-line position which substantially closes the inlet end 174 of duct 156. Valve 170 has secured thereto an operating arm 176 which may be actuated by means of a Bowden cable 178 or by any other suitable mechanism. The Bowden cable 178 may be operated from the passenger compartment of the vehicle or from any other desired location. In this construction it is seen that by manipulation of damper 170 the air flowing through duct 12 may be apportioned between duct 157 and discharge opening 168. In this manner the interior of the vehicle may be heated rapidly if it is so desired. It is also seen that substantially no heated air may be conducted to duct 156 if desired.

Fig. 6 discloses a still further modification of the present invention. In this construction duct 12 also has provided near the discharge end 180 thereof radiator 100 generally similar to those shown in Figs. 3 and 4 consisting of a main radiator section 104 and a second radiator section 102. Duct 12 terminates in an upwardly extending reduced portion as shown at 181 which terminates in a longitudinally extending narrow duct portion 182 for conducting heated air to the passenger compartment of the vehicle. An enlarged discharge opening 184 is provided in the lower wall 186 of reduced portion 181 which may be opened or closed by a valve 188. Valve 188 is pivoted on a pin 190 mounted in the side walls 192 of reduced portion 180 and has an operating arm 194 secured thereto. The outer end of arm 194 is pivotally attached as shown at 196 to the outer end of stem 198 of a thermostat 200. Thermostat 200 may be mounted in any suitable fashion as by bracket 202 secured to the side wall 192 of reduced portion 181. A partition member 204 is secured between radiator sections 102 and 104 and extends rearwardly at an angle as shown in Fig. 6. A second relatively short partition 206 extends rearwardly from the inner surface of radiator section 102 and is adapted to be engaged by the inner end of valve 188 when the latter is in its fully open position, as shown in full lines in Fig. 6. Thermostat 200 is so located as to be in contact with the air discharging from radiator 100. Before the radiator core becomes heated the air discharging therethrough is relatively cold causing contraction of the thermostat 200 and thereby causing the latter to swing the valve 188 in a clockwise direction to fully open position. This shuts off the air to duct 182 and consequently no air will flow into the passenger compartment. As the radiator 100 becomes heated the air passing therethrough will become correspondingly heated with the result that thermostat 200 will expand causing valve 188 to swing in a counterclockwise direction to open the inlet end to duct 182. When the temperature reaches a maximum value valve 188 will have been actuated to the dotted-line position thereby causing substantially all of the air flowing through both radiator sections 102 and 104 to flow into duct 182. When valve 188 is partially opened some air will flow through both discharge opening 180 and duct 182.

From the foregoing description it is seen that novel and highly improved means have been provided for not only effectively cooling the engine coolant but for effectively heating the fresh air flowing to the passenger compartment of the vehicle. It is also apparent that by mounting the radiator along side of the engine, the length of the engine compartment or the portion extending forwardly of the fire wall of the vehicle is materially shortened thereby resulting in economy in manufacture, greater visibility for the operator of the vehicle, and a generally improved automotive design.

While several embodiments of the invention have been shown and described, it will be apparent to those skilled in the art that other and further embodiments may be made without departing from the spirit of the invention. It therefore is to be understood that it is not intended to limit the invention to these embodiments but only by the scope of the claims which follow.

What is claimed is:

1. A motor vehicle having an engine compartment and a passenger compartment, an internal combustion engine mounted in said engine compartment, a coolant jacket on said engine, an air duct mounted in said engine compartment adjacent said engine, a radiator having two sections mounted in said duct, one of said sections communicating directly with said engine compartment, a second duct communicating with the other of said radiator sections and adapted to conduct the air passing through said other radiator section to said passenger compartment, a valve for controlling the flow of air in said second duct, means connecting said first radiator section to said jacket, additional means for conducting coolant to the other of said radiator sections, a control valve for controlling the flow of coolant in said additional means, by-pass means in said additional means for by-passing said control valve, a valve in said by-pass means, and means interconnecting said first and last mentioned valves, whereby when said first mentioned valve is actuated to reduce air flow in said second duct said last mentioned valve is correspondingly moved to open said by-pass, and when said first valve is actuated to increase air flow in said second duct said last mentioned valve is correspondingly moved to close said by-pass.

2. A motor vehicle having an engine compartment and a passenger compartment, an internal combustion engine mounted in said engine compartment, a coolant jacket on said engine, an air duct mounted in and arranged to discharge air rearwardly into said engine compartment adjacent said engine, a branch duct connecting said first duct to said passenger compartment, a sectional radiator having one relatively large section disposed in said first duct and a second relatively small section disposed in said branch duct, fluid conducting means connecting said first radiator section to said jacket, additional fluid conducting means for conducting coolant from said jacket to said second radiator section, thermostatically actuable valve means in said additional fluid conducting means for controlling the flow of coolant to said second radiator section, and valve means for controlling the flow of air in said ducts.

3. A motor vehicle having an engine compartment and a passenger compartment, an internal combustion engine mounted in said engine compartment, a coolant jacket on said engine, an air duct mounted in said engine compartment adjacent said engine having an enlarged inlet portion and a reduced portion, said reduced portion communicating with said passenger compartment, radiator means extending across said enlarged portion of said duct near the discharge end thereof, said enlarged portion having an enlarged opening therein adjacent the downstream side of said radiator means through which air may discharge into said engine compartment, and a butterfly valve for controlling the flow of air through said opening and in said reduced portion, said valve when in one position deflecting substantially all air flowing through said enlarged portion into said reduced portion, when in a second position deflecting all of the air flowing through said enlarged portion into said engine compartment and when in positions between said first and second positions apportioning the air between said discharge opening and said reduced portion of said duct.

4. A motor vehicle having an engine compartment and a passenger compartment, an internal combustion engine mounted in said engine compartment, a coolant jacket on said engine, an air duct mounted in said engine compartment adjacent said engine having an enlarged inlet portion and a reduced portion, said reduced portion communicating with said passenger compartment, radiator means extending across said enlarged portion of said duct near the discharge end thereof, said enlarged portion having an enlarged opening therein adjacent the downstream side of said radiator means through which air may discharge into said engine compartment, a butterfly valve for controlling the flow of air through said opening and in said reduced portion, said valve when in one position deflecting substantially all air flowing through said enlarged portion into said reduced portion, when in a second position deflecting all of the air flowing through said enlarged portion into said engine compartment and when in positions between said first and second positions apportioning the air between said discharge opening and said reduced portion of said duct, and thermostat means mounted adjacent said radiator at the downstream side thereof for actuating said valve.

5. A motor vehicle having an engine compartment and a passenger compartment, an internal combustion engine mounted in said engine compartment, a coolant jacket on said engine, an air duct mounted in said engine compartment adjacent said engine, a sectional radiator mounted in said duct near the discharge end thereof, coolant conducting means connecting said radiator sections to said jacket, means for inducing the flow of coolant through said radiator sections, a second duct mounted to receive air discharging through one of said radiator sections, said first mentioned duct having an enlarged opening near the downstream side of said radiator through which air may discharge into said engine compartment, a valve for controlling the flow of air through said opening and in said second duct, and thermostat means mounted in the path of air flowing through said radiator for actuating said valve.

6. A motor vehicle having an engine compartment and a passenger compartment, an internal combustion engine mounted in said engine compartment, a coolant jacket on said engine, an air duct mounted in said engine compartment, a radiator mounted in said air duct intermediate the ends of said engine, coolant conducting means connecting said radiator to said jacket, means for inducing circulation of coolant through said radiator whereby the heat absorbed by said coolant is dissipated to the air flowing in said duct, a branch duct connected to said first duct for conducting air to said passenger compartment, valve means for controlling the flow of air in said branch duct, a radiator mounted in said branch duct, coolant conducting means connecting said radiator to said jacket, and means for controlling the flow of coolant through said last mentioned radiator.

7. A motor vehicle having an engine compartment and a passenger compartment, an internal combustion engine mounted in said engine compartment, a coolant jacket on said engine, an air duct mounted in said engine compartment, a radiator mounted in said air duct intermediate the ends of said engine, coolant conducting means connecting said radiator to said jacket, means for inducing circulation of coolant through said radiator whereby the heat absorbed by said coolant is dissipated to the air flowing in said duct, a branch duct connected to said first duct for conducting air to said passenger compartment, valve means for controlling the flow of air in said branch duct, a radiator mounted in said branch duct, coolant conducting means connecting said radiator to said jacket, means for controlling the flow of coolant through said last-mentioned radiator, said last-mentioned means including thermostatically controlled valve operating means mounted in said passenger compartment, and air distributing means mounted in said passenger compartment operatively connected to said branch duct.

8. A motor vehicle having an engine compartment and a passenger compartment, an internal combustion engine mounted in said engine compartment, a coolant jacket on said engine, an air duct mounted in said engine compartment for conducting air to said passenger compartment, a radiator in said duct, a valve for controlling the air flow in said duct, conduit means connecting said radiator to said coolant jacket, a control valve for controlling the flow of coolant to said radiator, a second conduit connecting said coolant jacket to said control valve, a third conduit connecting said control valve to said radiator, by-pass means connecting said second and third conduits whereby said control valve may be by-passed, a valve in said by-pass means, and means interconnecting said first and last-mentioned valves whereby when said first-mentioned valve is actuated to reduce air flow in said duct, said last-mentioned valve is correspondingly moved to open said by-pass and when said first-mentioned valve is actuated to increase air flow in said duct said last-mentioned valve is correspondingly moved to close said by-pass.

9. A motor vehicle having engine and passenger compartments separated by a fire wall, an engine with a coolant jacket in said engine compartment, a relatively large air duct at one side of said engine adapted directly to receive outside air and arranged to discharge air into said engine compartment, a second relatively smaller duct passing through said fire wall and connecting said relatively large duct with said passenger compartment, radiator means having sections separately connected to receive engine coolant from said jacket, one of said sections being in said large duct for the primary purpose of cooling said engine and the other in said smaller duct for the primary purpose of heating said passenger compartment, and valve means arranged to control air flow in said smaller duct.

References Cited in the file of this patent

UNITED STATES PATENTS

| | | |
|---|---|---|
| 2,325,427 | Reynolds | July 27, 1943 |
| 2,391,408 | Galamb | Dec. 25, 1945 |
| 2,445,392 | Findley | July 20, 1948 |
| 2,490,919 | Raney | Dec. 13, 1949 |
| 2,586,689 | Mieras | Feb. 12, 1952 |
| 2,631,517 | Duhn | Mar. 17, 1953 |
| 2,727,692 | Stump | Dec. 20, 1955 |
| 2,729,158 | Wilfert | Jan. 3, 1956 |

FOREIGN PATENTS

| | | |
|---|---|---|
| 829,324 | France | Mar. 28, 1938 |